No. 883,006. PATENTED MAR. 24, 1908.
H. H. & D. H. ENNS & J. J. WIEBE.
COMBINED CULTIVATOR AND PLANTER.
APPLICATION FILED DEC. 10, 1907.
2 SHEETS—SHEET 1.
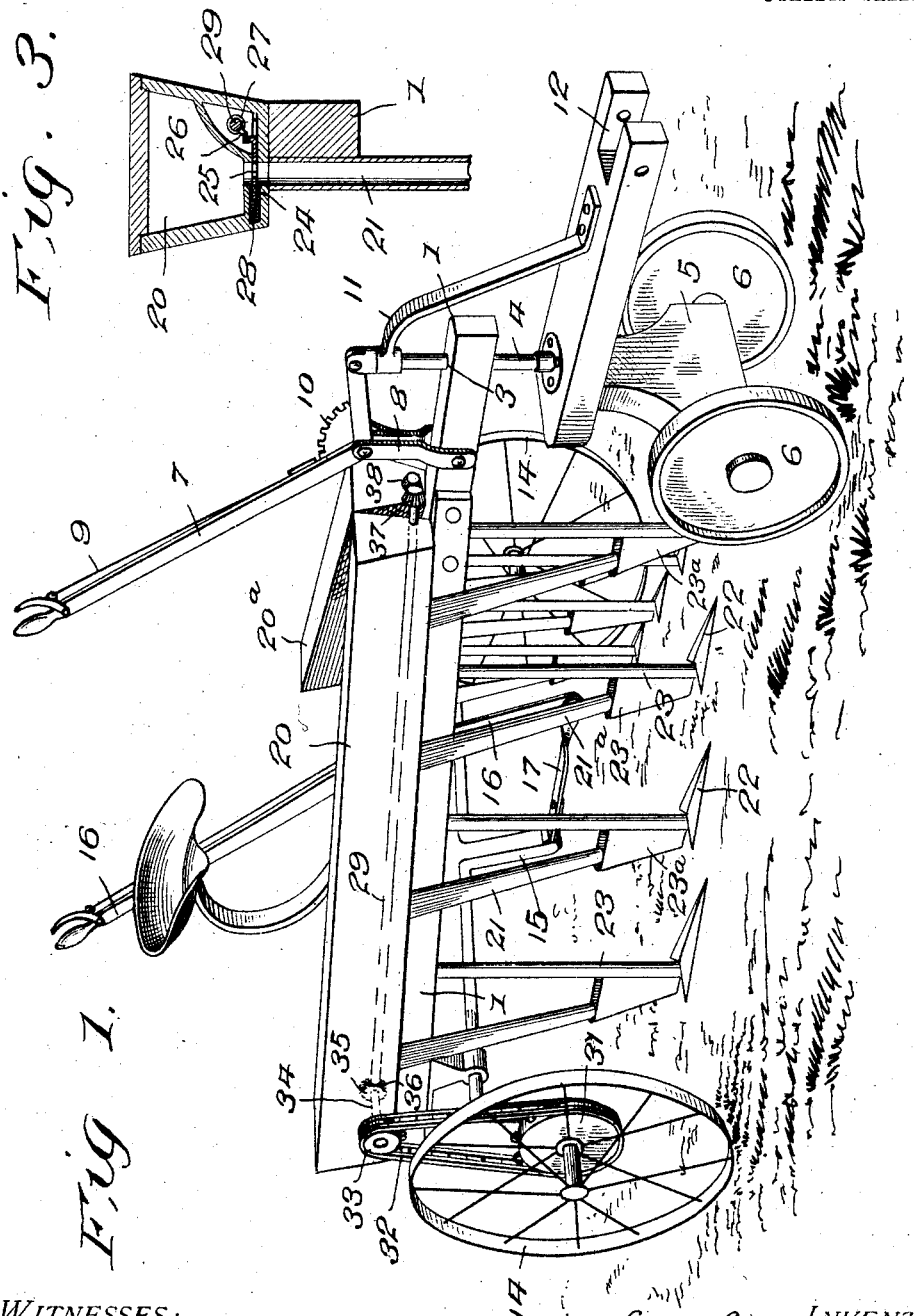

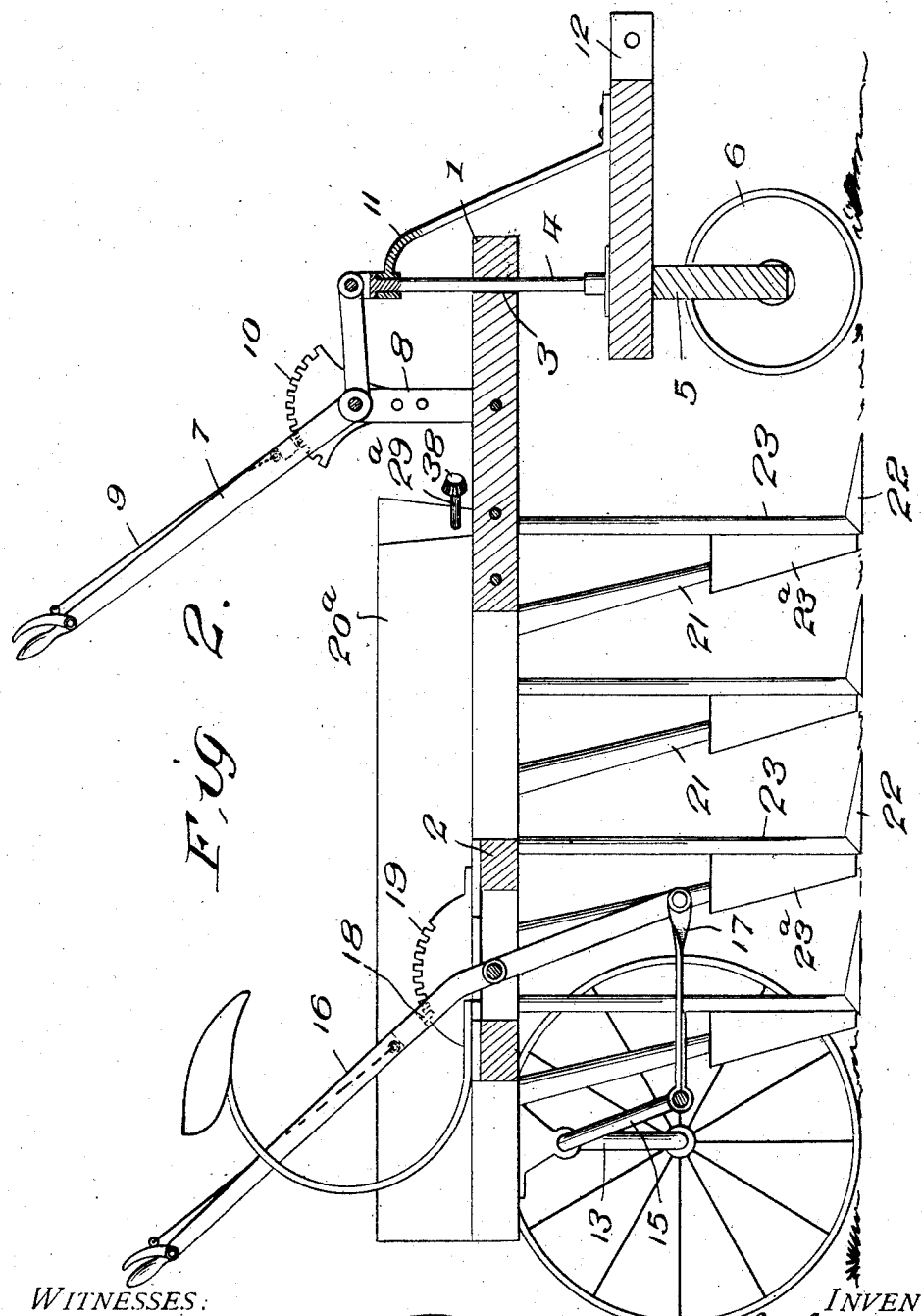

UNITED STATES PATENT OFFICE.

HENRY H. ENNS, DIETRICH H. ENNS, AND JOHN J. WIEBE, OF HOOKER, OKLAHOMA.

COMBINED CULTIVATOR AND PLANTER.

No. 883,006.  Specification of Letters Patent.  Patented March 24, 1908.

Application filed December 10, 1907. Serial No. 405,893.

*To all whom it may concern:*

Be it known that we, HENRY H. ENNS, DIETRICH H. ENNS, and JOHN J. WIEBE, citizens of the United States, residing at Hooker, in the county of Texas and State of Oklahoma, have invented certain new and useful Improvements in a Combined Cultivator and Planter; and we do hereby declare the following to be a full, clear, and exact description of the invention, such as will enable others skilled in the art to which it appertains to make and use the same.

Our invention relates to new and useful improvements in combined cultivators and planters and our object is to provide means for cultivating the surface of the soil and distributing the seed in the furrows made by the cultivating shovels.

A further object is to provide means for operating the seed-distributing mechanism and a still further object is to provide means for raising and lowering the cultivator attachment.

Other objects and advantages will be hereinafter referred to and more particularly pointed out in the claims.

In the accompanying drawings which are made a part of this application, Figure 1 is a perspective view of our combined cultivator and seed-distributer. Fig. 2 is a longitudinal, central, sectional view thereof, and, Fig. 3 is a sectional view on an enlarged scale through one of the seed-distributing hoppers.

Referring to the drawings in which similar reference numerals designate corresponding parts throughout the several views, 1 indicates the frame of our improved cultivator and seed-distributer, which is arranged substantially V-shaped and is connected together adjacent its rear end by means of a cross beam 2. The forward end of the frame 1 is provided with an opening 3, through which extends a standard 4, the lower end of said standard being secured to a truck frame 5, on which is mounted guide wheels 6. The standard 4 is adapted to move vertically through the opening 3 and has secured to its upper end a controlling lever 7, which lever is mounted on a bracket 8 carried by the frame 1 and in order to raise or lower the forward end of the frame, the lever 7 is provided with a latch mechanism 9, which is adapted to coöperate with a rack-bar 10, carried by the bracket 8. The upper end of the standard 4 is securely braced by extending a truss 11 from the upper end of the standard to the horizontal portion of the truck frame 5 and the forward end of said truck frame is provided with a recess 12, in which is adapted to be secured any suitable form of guiding tongue (not shown).

The rear end of the frame 1 has journaled thereto a drop axle 13, on which is mounted supporting wheels 14 and by which means the rear end of the frame is supported, said rear end of the frame being raised or lowered by providing a crank 15 at the longitudinal center of the axle 13, said crank being secured to an operating lever 16 by means of a link 17 and by pivoting the lever 16 to the frame 1, it will be readily seen that when the upper end of said lever is moved rearwardly or forwardly, the rear end of the frame 1 will be correspondingly raised or lowered and in order to hold the frame in its elevated position, the lever 16 is provided with a latch 18, which is adapted to coöperate with a rack 19 on the cross bars 2.

Mounted on the converging sections of the frame 1, are hoppers 20 and 20$^a$, which hoppers are adapted to contain and distribute various kinds of seed and the seed is conveyed to the distributing point by means of spouts 21, which depend from said hoppers. The soil is thoroughly pulverized and furrows formed for receiving the seed from the spouts 21 by means of shovels 22, which are carried at the lower ends of shanks 23, and, by securing said shanks at intervals along the converging portions of the frame 1, the path of said shovels will be spaced apart and by directing the lower ends of the spouts to a position immediately in the rear of and above said shovels, the seed in the hopper will be distributed in rows, the shovels being so constructed as to loosen the soil at a considerable distance to each side of the furrows, as well as form the furrows. The seed is positively guided into the furrows by placing tubular guides 23$^a$ on the shanks 23 and in position to receive the lower ends of the spouts 21, the lower ends of said guides terminating at a point immediately above the plane of the shovels.

The flow of the seed through the spouts 21 is controlled by means of plates 24, which are slidably mounted in the bottom of the hoppers and said plates are provided with openings 25, through which the seed passes when the opening is in registration with the spouts 21 and, in order to distsibute the seed in the furrows, the openings 25 are moved into registration with the spouts 21 by means of pins 26 on disks 27 engaging one end of the plates and moving the same longitudinally, the openings 25 being normally held out of registration with the spouts and when the plates have been moved to bring the openings therein in registration with the spouts, a spring 28 is employed for returning the plates to their initial positions and move the openings 25 out of registration with the spouts, so that the seed will only flow when the openings have been moved into registration with the spouts. The disks 27 are mounted on shafts 29 and 29ª in the hoppers 20 and 20ª, respectively, which shafts are rotatably mounted adjacent one wall of the hoppers and at the lower edge thereof, the seed being held from contact with the shafts by disposing shields 30 over said shafts.

The movement of the plates 24 may be readily increased to increase the amount of seed in the rows by increasing the number of pins on the disks 27. The shaft 29 in the hopper 20 is driven from one of the supporting wheels 14 by securing to said supporting wheel a driving sprocket 31, around which is disposed a sprocket chain 32, the upper end of said chain passing around a sprocket 33 carried on a stub shaft 34, the inner end of said shaft having a bevel pinion 35, which meshes with a similar pinion 36 on the end of the shaft 29 and the shaft 29ª in the opposite hopper is driven from a pinion 37 on the extended end of the shaft 29 engaging a pinion 38 on the extended end of the shaft 29ª, said shafts being so arranged that they will intersect each other at the forward ends of the hoppers, the pinions 37 and 38 causing said shafts to rotate in unison.

It will thus be seen that we have provided a very cheap and efficient device for giving surface cultivation to the soil and also for depositing seed in the furrows produced by the cultivator attachments. It will further be seen that the grain may be deposited at various depths in the earth and the amount of seed deposited in the rows readily regulated by increasing or decreasing the number of pins on the plate-controlling disks.

What we claim is:

1. In a combined cultivator and planter, the combination with a converging frame, supports for each end of said frame and means to operate said supports to raise or lower the frame; of hoppers on the converging portions of the frame, spouts depending from said hoppers, shanks depending from the frame and immediately in front of the lower ends of the spouts, cultivating shovels on the lower ends of said shanks, shafts extending longitudinally through said hoppers, pinions on the meeting ends of said shafts adapted to mesh with each other and rotate said shafts in unison, plates slidably mounted in said hoppers, above said spouts, said plates having openings therein, means to normally hold said openings out of registration with the spouts and means on said shafts to move said plates longitudinally and register the openings in the plates with the spouts.

2. In a combined cultivator and planter, the combination with a converging frame, shanks depending from said frame, shovels on said shanks, a standard at the forward end of said frame, a supporting truck for the standard, means to adjust the forward end of the frame on said standard, an axle at the rear end of the frame, supporting wheels on said axle, a crank at the longitudinal center of said axle and means connected to said crank to raise and lower the rear end of the frame; of hoppers on the converging portions of said frame, spouts depending from said hopper and adapted to feed the grain in the rear of said shovels and means to deposit the grain in said spouts.

3. In a combined cultivator and planter, the combination with a substantially V-shaped frame, supporting means for each end of said frame, means to independently raise or lower the ends of the frame, shanks depending from said frame and cultivating shovels on said shanks; of hoppers on the converging portions of said frame, shafts extending longitudinally of said hoppers, plates slidably mounted in said hoppers, said plates having openings therein, spouts depending from said hoppers and below said plates, disks on said shafts, means on said disks to move said plates longitudinally and register the openings therein with the spouts and means to rotate said shafts in unison.

In testimony whereof we have signed our names to this specification in the presence of two subscribing witnesses.

HENRY H. ENNS.
DIETRICH H. ENNS.
JOHN J. WIEBE.

Witnesses:
FRANCIS T. NORBURY,
A. A. VIEBIG.